(No Model.) 3 Sheets—Sheet 1.
J. H. CROSKEY & J. LOCKE.
MANUFACTURE OF HOLLOW GLASS ARTICLES.
No. 528,081. Patented Oct. 23, 1894.
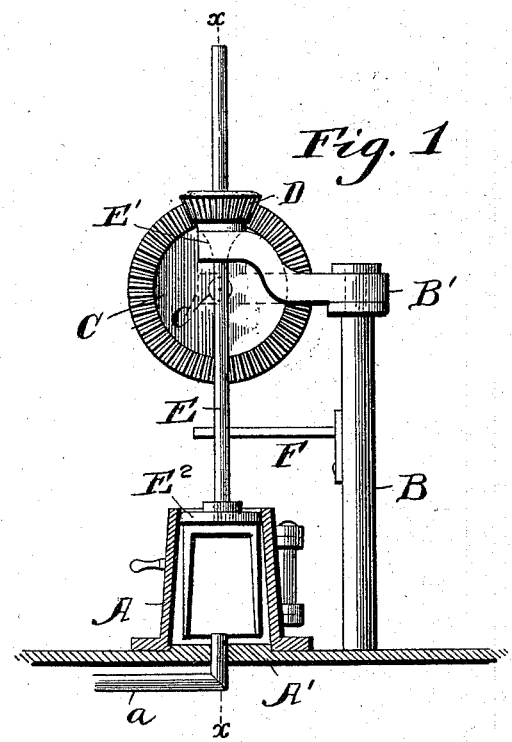
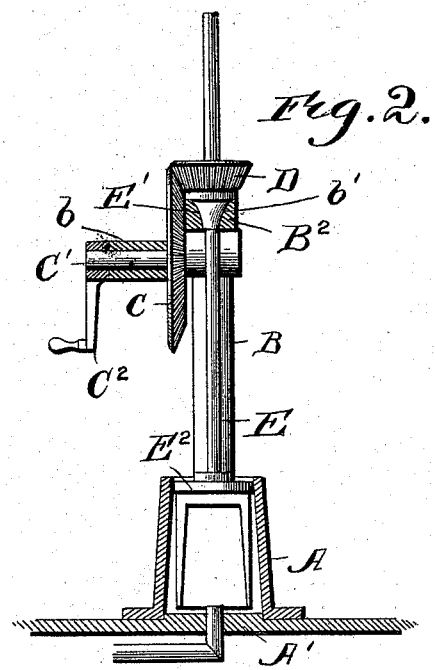
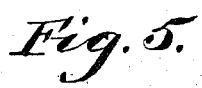
Fig. 5.
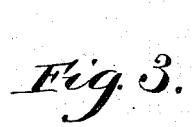
Fig. 3.
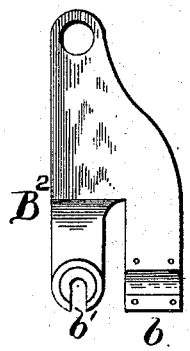
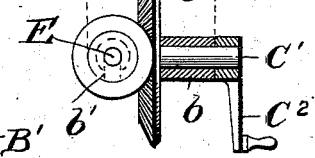
Fig. 4.
Witnesses:
J. B. McGinn
R. C. Cassell
Inventors:
John H. Croskey
Joseph Locke
by Connolly Bros
attys (No Model.) 3 Sheets—Sheet 2.
J. H. CROSKEY & J. LOCKE.
MANUFACTURE OF HOLLOW GLASS ARTICLES.
No. 528,081. Patented Oct. 23, 1894.
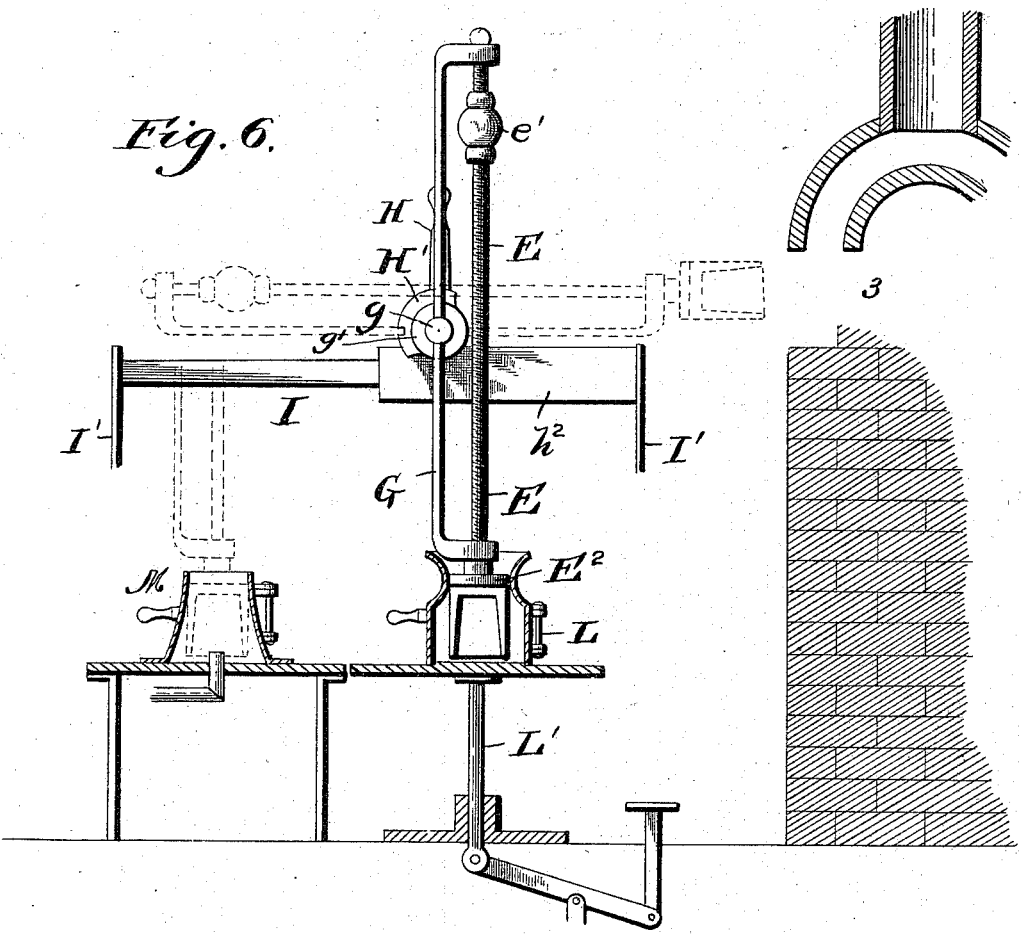
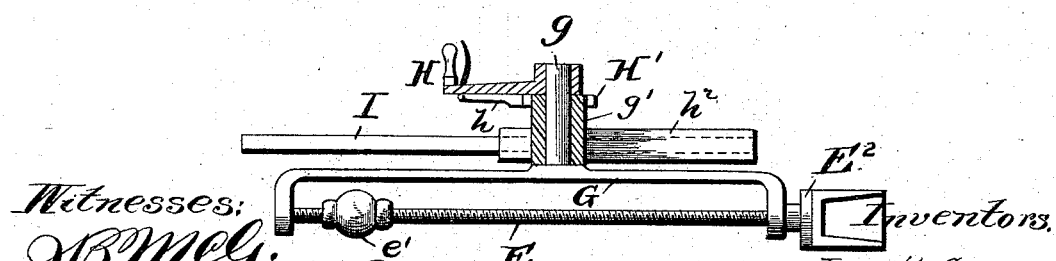
Witnesses:
J. B. McGirr
R. C. Cassell
Inventors.
John H. Croskey
Joseph Locke
by Connolly Bros
attys (No Model.) 3 Sheets—Sheet 3.
J. H. CROSKEY & J. LOCKE.
MANUFACTURE OF HOLLOW GLASS ARTICLES.
No. 528,081. Patented Oct. 23, 1894.
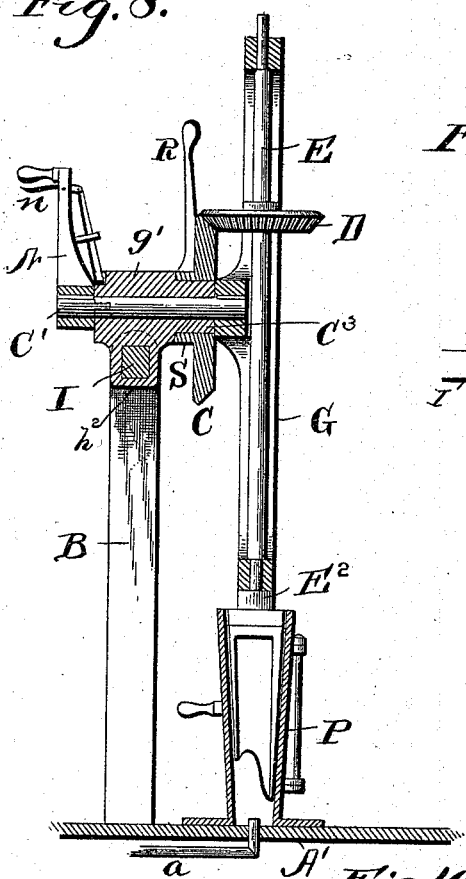
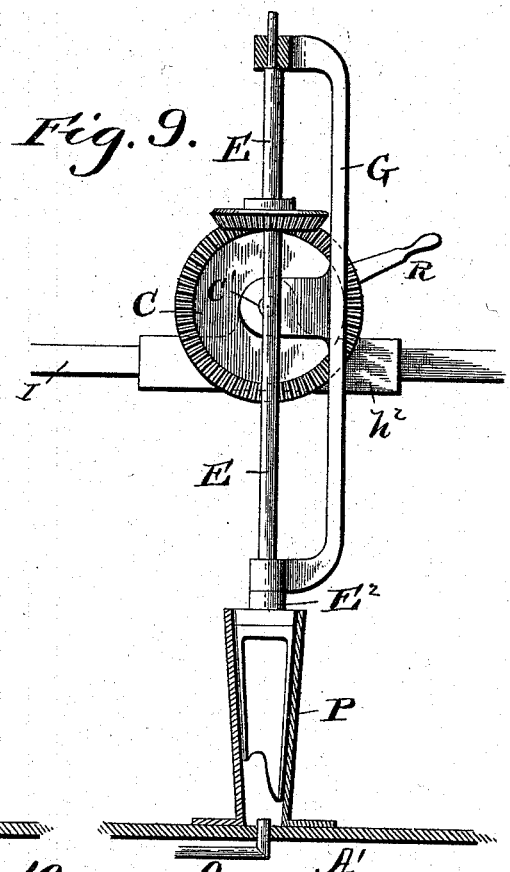
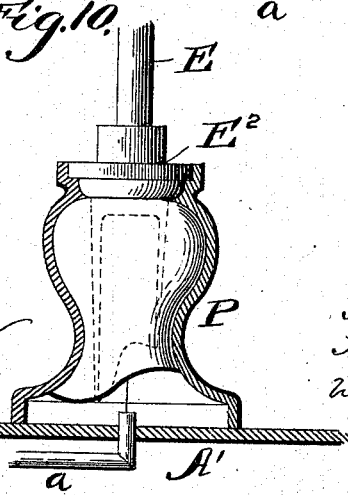
Witnesses:
J. B. McGirr.
R. C. Cassell.
Inventors:
John H. Croskey
Joseph Locke
by Connell Bro.
Attys

UNITED STATES PATENT OFFICE.

JOHN H. CROSKEY AND JOSEPH LOCKE, OF PITTSBURG, PENNSYLVANIA.

MANUFACTURE OF HOLLOW GLASS ARTICLES.

SPECIFICATION forming part of Letters Patent No. 528,081, dated October 23, 1894.

Application filed April 16, 1894. Serial No. 507,740. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in the Manufacture of Hollow Glass Articles; and we do hereby declare the following to be a full, clear, and exact description of the invention, such as will enable others skilled in the art to which it appertains to make and use the same.

This invention has relation to the manufacture of hollow glass articles, and consists in the novel method and means for forming or finishing glass ware by centrifugal action.

In carrying our invention into effect we impart to the punty or other glass holding tool, to which is attached the unfinished article of glass, and while the latter is in the finishing mold, a rapid rotary axial motion which will produce a centrifugal expansion of the glass and cause it to spread laterally against the walls of the mold. When necessary and before inserting the article in the finishing mold, we also impart to the tool a rotary motion in a circle to which the tool is radial, so as to centrifugally elongate the glass article. We also provide means for the adjustment of the tool in a horizontal position, so as to reheat the glass at the glory hole, and for shifting the position from the press mold to the finishing mold.

In the accompanying drawings, Figure 1 is a side elevation, partly in section of a centrifugal apparatus for finishing tumblers. Fig. 2, is a vertical central section. Fig. 3, is a side elevation partly in section, with the punty rod elevated. Fig. 4, is a plan view. Fig. 5, is a detail view in plan of part of the apparatus shown in Fig. 1. Fig. 6, is a side view of a modified construction of centrifugal apparatus in which the punty has a rotary axial motion, a rotary motion on a vertical plane, and a horizontal reciprocating motion on a guide rod. Fig. 7, is a plan view of the apparatus illustrated in Fig. 6. Fig. 8, is a vertical central section of a modified construction of apparatus in which the punty has the same motions as in the apparatus shown in Figs. 5, 6, and 7, but by different mechanism. Fig. 9, is a front view of the apparatus shown in Fig. 8. Fig. 10, is a vertical central section of a finishing mold.

The apparatus illustrated in Figs. 1 to 5 is intended and adapted for finishing articles such as tumblers, "sugars," "spoons," &c., from gatherings or balls, which have received a preliminary shaping in a press mold, and it is to be understood that our invention contemplates in most cases a preliminary shaping in a press mold of articles to be afterwards finished by centrifugal action. Such preliminary shaping is common in other processes of finishing glass ware and the purpose and effect are well known and are briefly to give the ball or gathering taken from the melting pot such form and proportions as will conduce to and facilitate its expansion in the finishing mold, so as to fill the latter.

In Figs. 1 to 5, A represents the finishing mold, preferably a paste mold, made in two or more hinged sections, and mounted on a suitable base plate A'. B is a standard rising from the base plate A', and having mounted on its upper end the mechanism for supporting the punty or snap rod and for rotating the same on its axis. This rotating mechanism consists of the beveled spur wheel C and pinion D. The former is attached to a horizontal shaft C' having its bearing in a box $b$, forming part of a casting B' which is secured to the top of the standard B. On the outer end of the shaft C' is a crank C², by which the shaft is turned. The pinion D is secured to the punty or snap rod E, and below the pinion D is a tapered collar E' which constitutes a spindle for the rotation of the rod E. The arm B² of the casting B' has a radial slot $b'$ in its end, properly rounded at its inner end, and tapered on its sides, so as to form a seat or bearing for the spindle E' which is slipped into place through the slot $b'$ horizontally. F is an arm or plate secured to the standard B and forming a centering guide and lower bearing for the punty rod.

In using the apparatus, the punty rod is removed and the head E² attached to the glass article as it comes from the press mold, and the glass is then reheated at the glory hole, the punty being held by a boy. When the article is properly heated, the punty rod is replaced in the centrifugal machine, the small part of the rod being first inserted in the slot $b'$ in arm $B^2$, and the rod then dropped down. The finishing mold is now closed, and the crank $C^2$ turned. By this means the glass is rapidly rotated in the mold, and by centrifugal action is caused to expand laterally and fill the mold. An air pipe $a$, leads into the bottom of the mold, and a valve thereon controlled by a foot lever is operated so as to admit air to cool the glass, after which it is removed from the mold and the operation repeated.

In Figs. 6 and 7 the apparatus shown is intended for operating on articles which require to be elongated as well as expanded after leaving the preliminary press mold such as tankards, pitchers, &c., and for this purpose the mechanism is so constructed that the punty or snap rod may be given two rotary motions, one on its vertical axis, and the other in a vertical plane and horizontal axis. The punty rod is also movable in a horizontal direction so as to shift it from the press mold to the finishing mold, without removing it from the bearings. The punty rod E is swiveled at its ends in the bent ends of a bar G which has extending from its middle part a spindle $g$, which is mounted in a journal box $g'$ and carries on its outer end a crank H. A ratchet disk H' is secured to the box $g'$ and a pawl or dog $h$ carried by the crank arm engages when desired with the teeth of this ratchet. The box $g'$ is formed with a horizontal sleeve $h^2$ on its under side, and this sleeve is fitted to slide upon a horizontal rod I mounted on the frame work I' of the machine. The punty rod E is formed with a screw thread or spiral twist, upon which plays a nut or hand piece $e'$ by the vertical movement of which the punty rod is made to turn rapidly on its axis so as to whirl the glass on its lower end and cause it to expand within the finishing mold.

Fig. 6, shows, in dotted lines the punty rod in a horizontal position, with the glass article at the mouth of the glory hole where it is being reheated after leaving the press mold and preparatory to its introduction into the finishing mold. L designates the press mold, mounted on a post L' which is attached to a treadle so that the mold may be raised by pressing on the treadle, to bring the glass article which has been passed therein against the head $E^2$ on the lower end of the punty, to which head the glass adheres in the usual way. The press mold and centrifugal machines are close to the reheating furnace, 3, and when the press mold is opened after adherence of the glass to the punty rod, the latter, with the bar G is turned to the horizontal position shown in dotted lines in Fig. 6, where it is held by the dog or pawl $h$ on the crank arm engaging with the ratchet disk H'. The sleeve $h^2$ allows the punty rod to be pushed forward so as to pass the glass article into the glory hole, and allows it to be drawn back so as to bring it over the finishing mold which is shown at M on Fig. 6, whereupon the punty rod is turned to a vertical position and the glass article inserted into the open finishing mold and the latter closed. The punty rod is now rotated with a reciprocating motion by manipulating the nut $e'$, and the glass caused to expand by the centrifugal action thus produced. If the article is to be elongated as in making a tankard, base or pitcher, the punty rod, after the article leaves the press mold, is rapidly rotated in a vertical plane, by turning the crank H either continuously in one direction or reciprocally in opposite directions. When it is desired to rotate the punty in a vertical plane the pawl $h$ is thrown out of engagement with the ratchet H'.

The apparatus illustrated in Figs. 8 and 9 is also intended and adapted to impart two rotary motions to the punty rod, but the punty rod in this instance is rotated on its axis by means of the bevel spur wheel C and pinion D the spur wheel being mounted on a sleeve $C^3$ formed on the box $g'$, and having a handle R, by which it can be reciprocated. The sliding sleeve $h^2$ and the horizontal rod and mountings therefor are the same as in Fig. 6. The finishing mold is shown at P, and is for finishing a tankard shaped article, the same having been elongated after leaving the press mold by swinging or rotating the punty in a vertical plane. To reach the glory hole and withdraw the article therefrom the punty rod and its supporting frame G are turned around to a horizontal position by turning the crank N a quarter revolution and then sliding the sleeve or box $g'$ as required. When it is desired to twirl the punty rod axially, a handle R projecting from a collar S formed on the beveled spur wheel C is reciprocated, the spur wheel C being journaled on a sleeve $C^3$ formed on the box $g'$. When it is required to turn the punty rod in a vertical plane a dog $n$ on the handle N is disengaged from notches $n'$, $n^2$, which retain the frame G in its horizontal and vertical positions respectively, and the frame G, and punty rod are swung round and round by turning the crank N.

Fig. 10, shows a finishing mold for pitchers. The article before insertion in the mold is elongated by the means already described. The finishing molds in all cases may be provided with air inlets, either to admit air to cool the article or to aid in expanding it should at any time a slight air pressure be required.

Having described our invention, we claim—

1. The method of forming or finishing hollow articles of glass ware, by centrifugal action, which consists in imparting to the article, while heated, and while in the mold, a rapid axial motion, independently of the mold.

2. The method of forming or finishing hollow articles of glass ware, by centrifugal action, which consists in imparting to the glass article, a rotary motion in a vertical plane so as to cause the article to elongate and then inserting the article in a finishing mold and imparting to the glass article an axial motion, so as to cause the article to expand laterally.

3. In a glass forming and finishing machine, the combination with a forming mold, a finishing mold and a punty supporting frame mounted on a sliding sleeve and adapted to be moved over said molds successively, of mechanism for imparting axial motion to said punty rod, substantially as described.

4. In a centrifugal glass finishing machine, the combination with a finishing mold, of a mechanical revoluble punty rod E, a beveled pinion D, keyed on said punty, a punty supporting frame G, consisting of a bar having its ends bent inwardly and formed with boxes for the reception of said punty rod, a sleeve or box S, mounted and adjustable on a bar I, a horizontal shaft C having its bearings in said sleeve and connected at its inner end to the frame G, a crank or operating handle N, attached to the outer end of said shaft, and a beveled spur wheel C revolubly mounted on said sleeve and meshing with said pinion, and an operating lever attached to the collar of said spur wheel, substantially as described.

In testimony whereof we affix our signatures in presence of two witnesses.

JOHN H. CROSKEY.
JOSEPH LOCKE.

Witnesses:
ALBERT J. HENNING,
C. E. SUCCOP.